A. C. IONIDES, Jr., AND S. V. COOKE.
GAS FURNACE REGULATING SYSTEM.
APPLICATION FILED DEC. 19, 1916.

1,347,954.  Patented July 27, 1920.
5 SHEETS—SHEET 1.

Fig.1

A. C. IONIDES, Jr., AND S. V. COOKE.
GAS FURNACE REGULATING SYSTEM.
APPLICATION FILED DEC. 19, 1916.

1,347,954.

Patented July 27, 1920.

A. C. IONIDES, Jr., AND S. V. COOKE.
GAS FURNACE REGULATING SYSTEM.
APPLICATION FILED DEC. 19, 1916.

1,347,954.

Patented July 27, 1920.

UNITED STATES PATENT OFFICE.

ALEXANDER CONSTANTINE IONIDES, JR., AND SIDNEY VICTOR COOKE, OF LONDON, ENGLAND; SAID COOKE ASSIGNOR TO SAID IONIDES.

GAS-FURNACE-REGULATING SYSTEM.

1,347,954.      Specification of Letters Patent.      Patented July 27, 1920.

Application filed December 19, 1916. Serial No. 137,885.

*To all whom it may concern:*

Be it known that we, ALEXANDER CONSTANTINE IONIDES, Junior, of 34 Porchester Terrace, London, W., England, and SIDNEY VICTOR COOKE, of 97 Lewin road, Streatham, London, S. W., England, subjects of the King of Great Britain and Ireland, have invented certain new and useful Gas-Furnace-Regulating Systems, of which the following is a specification.

This invention relates to the burning of gaseous mixtures of a combustible and a supporter of combustion which at constantly related pressures above that of the atmosphere are mixed together in correct proportions and consumed under plenum conditions in a closed furnace without additional air and from which the cooled products of combustion are displaced in a downward direction to maintain a slight back pressure.

When using a mixture of two elastic fluid constituents, for example gas and air, both at a pressure above atmosphere, in apparatus having a plurality of burners and provided with governing means, such as a movable diaphragm subjected on its opposite sides to the pressure of the constituents and by its movement operating valves which maintain a constant relation between the pressures of the two constituents, it has been found convenient for obtaining a correctly proportioned mixture to provide means which are capable of controlling the area of the conduits at the point where mixing of the constituents occurs consequent upon the junction of the conduits adjacent to the burners and such means have conveniently taken the form of plug valves in which each constituent passes through a separate passageway of adjustable area in the plug, so that in addition to adjusting the proportions of the constituents of the mixture the supply can be controlled without affecting the proportions. In such a carefully balanced arrangement, however, a variation in the quality of the combustible as is always possible when using ordinary gas necessitates a readjustment of the valve or like means which controls the supply to each burner.

The object of the present invention is to provide a distribution system of the type indicated in the preceding paragraph and having increased facilities for compensating for a variation in the gas and simplified and improved devices for controlling, mixing and distributing the constituents.

A further object is to secure the uniform maintenance of any desired temperature in the furnace and to prevent back-firing.

The invention consists in the improved gaseous fuel furnace system and various features thereof as hereinafter described and more fully pointed out in the claims.

Referring now to the accompanying more or less diagrammatic drawings:—

Figure 1 is an elevation partly in section, and

Figure 1:
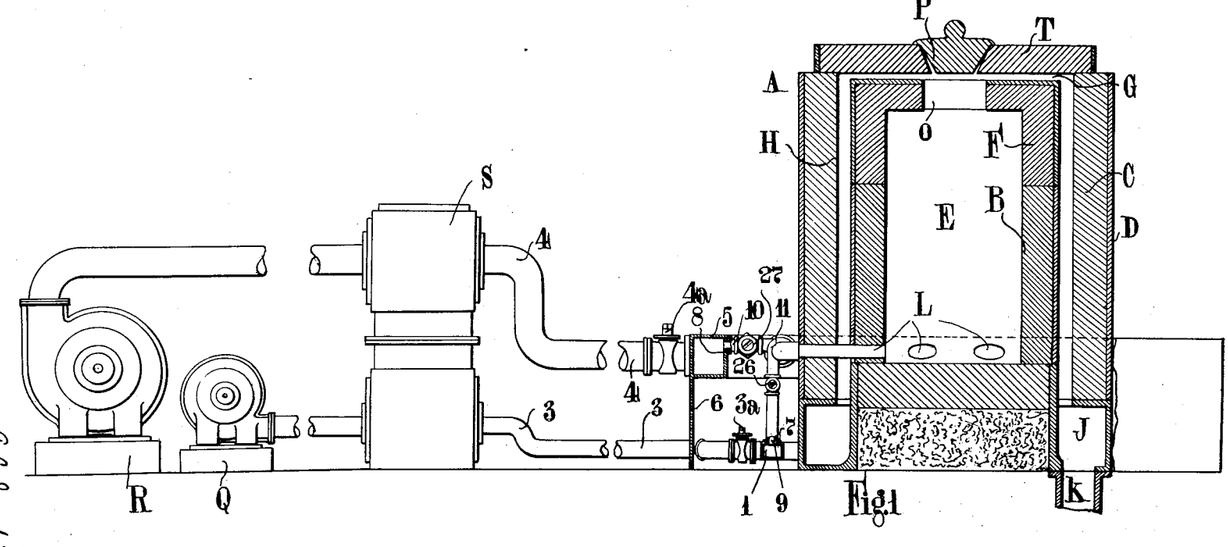
Figure 2:
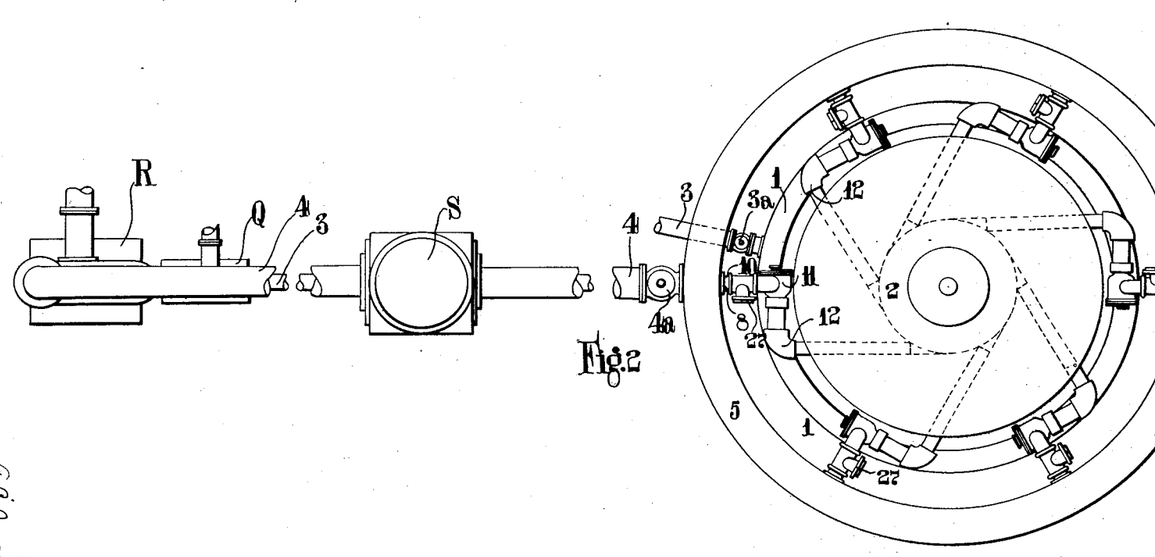
Fig. 2 is a plan of one convenient form of gaseous fuel furnace system according to this invention.

In carrying the invention into effect in one form, as shown by way of example in Figs. 1 and 2 of the accompanying drawings, A is a furnace constructed of two concentric hollow cylinders B and C of firebrick or like refractory material. The outer cylinder C is formed as a lining to the cylindrical metal casing D and is provided with a movable top T having an inspection plug P. The inner cylinder B is situated concentrically within the outer cylinder and may also be surrounded by a metallic shell M.

The central or heating chamber E is provided with a cover F for inserting the material to be heated and it communicates by means of the orifice O and the encircling space G with the annular surrounding or jacketing flue H which opens below into the conduit J from which branches the downwardly directed outlet pipe K.

The chamber E is heated by means of one or more tiers of burners or jets L which deliver the combustible mixture tangentially to the surface of the chamber wall, the products of combustion passing away through the space G and flue H, where they form a jacket for and assist in maintaining the temperature of the heating chamber. The waste gases finally leave the apparatus by downward displacement through the pipe K thus maintaining a slight pressure in the furnace chamber equal to the difference in weight per unit area of a column of the heated gases of a height equivalent to the vertical distance between the mixture inlet and flue discharged to atmospheric pressure and a similar column of air, which pressure is irrespective of damper or like checking means and automatically operates to maintain an even temperature within the furnace.

The constituents of the self-burning combustible mixture which in most cases are gas and air are delivered from suitable supply means such as blowers or the like Q, R, to a pressure control device or pressure balance S wherein a constant relationship between their pressures is maintained as hereinafter described.

The constituents of the mixture are conveyed from the pressure balance S to the furnace or like heating device by feed pipes 3 and 4 having valves $3^a$ and $4^a$ or like control means, and the gas feed pipe enters a capacious annular conduit 1 forming a reservoir or box which may, as shown, be positioned below and concentric with the axis of the heating chamber E of the furnace.

Surrounding the gas conduit 1 and concentric therewith is a second annular member 5 which forms an inclosure for the gas conduit and is also constructed so as to provide a conduit or reservoir for the air. To this second conduit the air feed pipe 4 is connected.

The cross-sectional areas of the air and gas conduits 5 and 1 may be roughly in the proportion of about nine to one where ordinary lighting gas is employed, or the areas may be about equal in cases in which Dowson or power gas is used.

The gas conduit may be placed directly upon a platform or other suitable foundation, and the air conduit may be arranged slightly above the gas conduit and supported upon a projecting lower curtain or edging 6 through which the feed pipe 3 for the gas conduit may be taken as shown at any convenient point.

Upon the upper surface of the gas conduit and the inner surface of the air conduit there are provided suitable screwed connection bosses or lugs 7, 8, these connection bosses being arranged in pairs and a pair of bosses being provided for each burner or jet of the furnace.

Each pair of bosses is connected by means of suitable pipes 9, 10, with a mixing appliance 11, and in which the air and gas entering by suitably inclined passages are thoroughly mixed together by creating vortices in the mingled current, the mixing appliances 11 being positioned above the gas conduit and conveniently all at the same height or otherwise arranged so as to suit the number of tiers of burners or jets and to afford, as far as possible, corresponding conditions of feeding to all the mixing appliances. From the mixing appliances 11 connecting pipes 12 may be taken direct to the various burners or jets of the furnace.

In the distribution system hereinbefore described the whole of the connections are symmetrically arranged and are efficiently protected from any accidental derangement which may occur from material being moved about adjacent to the furnace. The proportions of the constituents of the mixture are also easily controllable within reasonable limits by manipulation of one or both of the valves $3^a$, $4^a$, controlling the feed pipes 3 and 4, so that a variation in the quality of the gas may be compensated for without alteration of any adjustments which may have previously been made in, or in connection with the mixing appliances themselves.

If adjustment is made by means of one valve only, this valve is preferably the one which controls the constituent having the greater volume which in a mixture made from ordinary lighting gas and air is the air. If desired, therefore, the feed pipe for this constituent alone need be fitted with a valve, in which case the possibility of misuse of gas is greatly reduced.

Figures 3, 4:
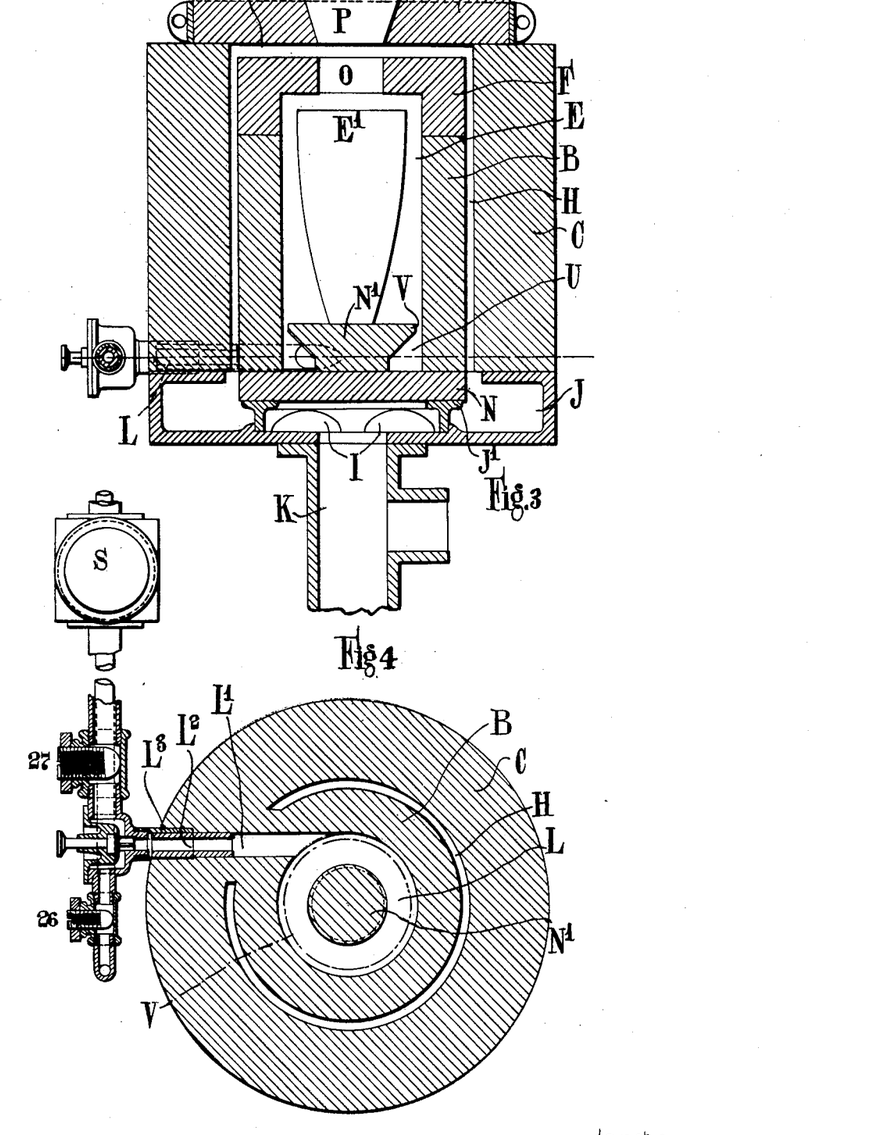
Figs. 3 and 4 show in sectional elevation and plan a different form of distribution system applied to a crucible furnace.

In the system shown by way of example in Figs. 3 and 4, the number of burners for distributing the heat in the furnace is greatly reduced, a separate combustion chamber or internal method of temperature control being adopted and in the form illustrated only one burner being employed. In this form a heating chamber E which may contain a crucible E' is surrounded by two concentric cylindrical walls B and C having an annular jacketing flue space H between them. The wall B supports a cap F having a central aperture O and the wall C carries a cover T provided with a removable plug P. The space G between F and T forms a communication from the aperture O so that the combustion gases vent themselves downwardly as in the previous form through the annular jacket H and pass thence through the hollow platform J by way of the apertures I in the central supporting ring J' to the down-take discharge pipe K.

In the bottom of the furnace chamber is placed a block of fireproof material N' which is secured upon the central bed N and so shaped as to form an annular combustion chamber U into which one or more burners or jets such as L deliver a combustible mixture tangentially. The annular chamber U opens into the main chamber E through a narrow slit or annulus V and thus forms a slotted conduit or duct for evenly distributing the products of combustion over the heating chamber wall, and maintaining uniform temperature conditions. The chamber wall may be so shaped as to deflect the flow of combustion gases therefrom against the crucible or other object to be heated.

With an arrangement such as hereinbefore described one large nozzle will be found to be satisfactory where several were formerly found to be desirable.

Figure 5:
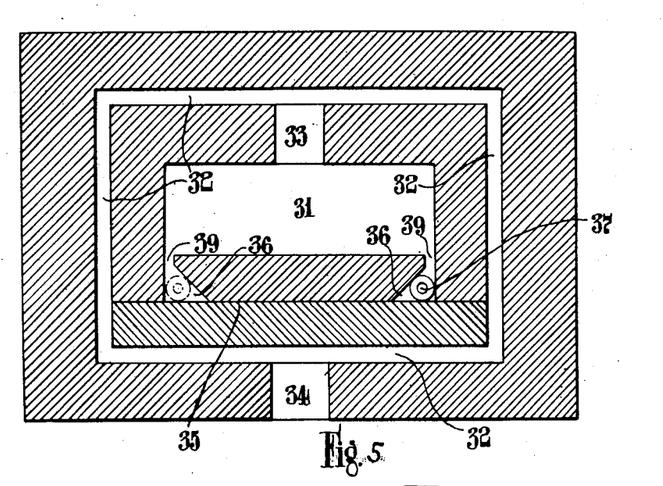
Figs. 5 and 6 illustrate features of the invention applied to a flat rectangular furnace.
Figure 6:
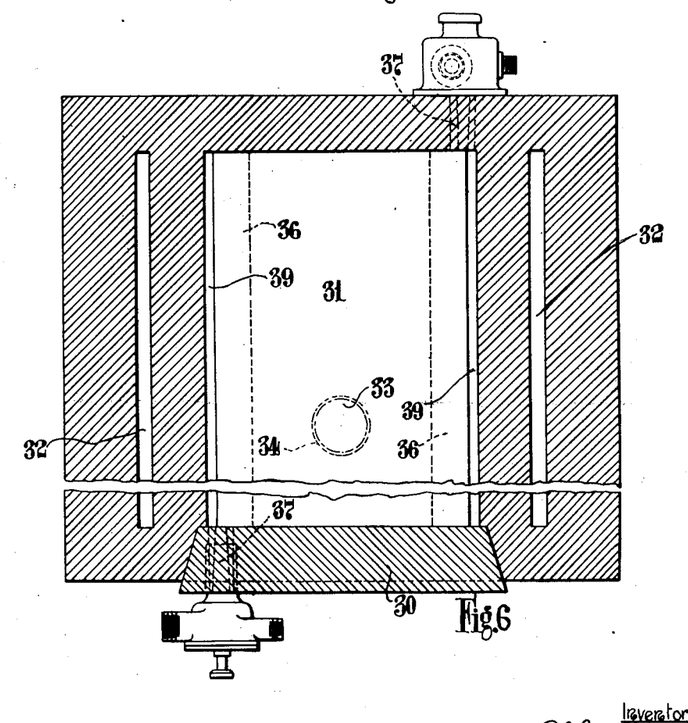

In applying features of the invention to a rectangular heating furnace as shown by way of example in Figs. 5 and 6, a heating chamber 31 having a door 30 at the front is provided above, below and upon the greater portion of its sides with jacketing flue spaces 32. The chamber 31 communicates, preferably by a single central aperture 33, with the top flue space, and the heating elements passing through said aperture pass downward through the flues 32 and are finally discharged through the outlet pipe 34.

In the bricks 35 forming the floor there is provided along each of the two long sides a narrow combustion chamber 36 into which a burner or jet 37 delivers mixture from a mixing device.

The long combustion chambers 36 each deliver the products of combustion by a long narrow slit 39 into the furnace chamber 31, and the burners are preferably positioned at the opposite ends of the combustion chambers so that the products of combustion as they issue from the slits may also have longitudinal motion, the combination of which tends to produce a whirling of the gases in the chamber as they pass up to escape at the aperture 33 thus insuring uniform heat distribution by the slotted ducts as hereinbefore described.

It is preferable to rely on the mixture delivery pressure alone to cause flow of the combustion gases through the furnace chamber, so that the maximum utilization of heat may be secured.

The mixing appliances for creating vortices and thoroughly mixing the constituents may take the form of a plug valve of the type hereinbefore described in combination with a length of passageway in which one or more abrupt right angle bends are provided for suddenly deflecting the mingled constituents of the mixture first in one and then in another direction so as very thoroughly to mix the constituents.

Any other device as for example, annular chambers, shown, may however be provided for mixing the gas and air or equivalent gaseous fluids.

It has been found that when very high temperatures are sought to be attained in this class of furnace firing back to the mixing point tends to occur, and in order to obviate this the nozzle mouthpiece or point of maximum velocity of the mixture entering the combustion chamber may be removed so far from the zone of impingement of said mixture on an internal surface of said chamber that the temperature behind said nozzle mouthpiece is insufficient to promote back-firing of the mixture.

Means, if necessary, such as a metal sleeve or water jacket encircling the nozzle may also be provided for preventing the transmission of heat to the entering mixture behind the nozzle mouthpiece by conducting the heat quickly away from the nozzle.

In carrying this feature of the invention into effect in one form, a furnace such as shown in Figs. 1 and 2 or 3 and 4 may be provided with one or more tangential admission passages leading into the combustion chamber. In a furnace chamber, say, for example, of 6″ in diameter, the admission passage or passages L′ may be about 1¼″ in diameter and the inside diameter of the nozzle mouthpieces L² conveniently ⅝″. Each nozzle conveying the mixture from a mixing device may extend into its admission passage to a point approximately 4″ from the nearest point of entrance of the passage into the furnace, thus insuring that the nozzle mouthpiece is at such a distance from the zone of impingement of the mixture on the surface of the combustion chamber that the radiation or other transmission of heat to the nozzle shall be insufficient to cause back-firing behind the nozzle mouthpiece.

The nozzle which is preferably constructed of a refractory or like heat resisting material may be encircled by a metallic sleeve, such as L³.

Figure 7:
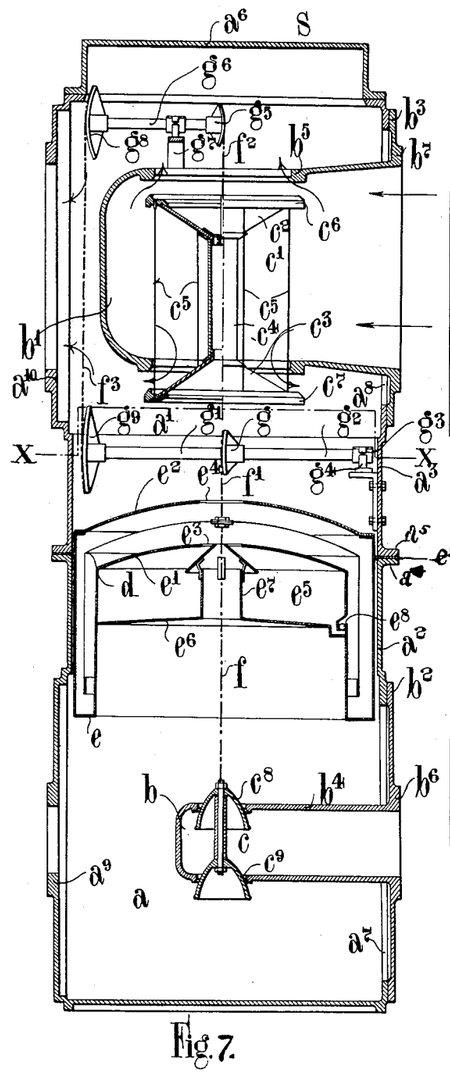
Figs. 7, 8 and 9 show details of the pressure controlling or balancing device.
Figure 8:
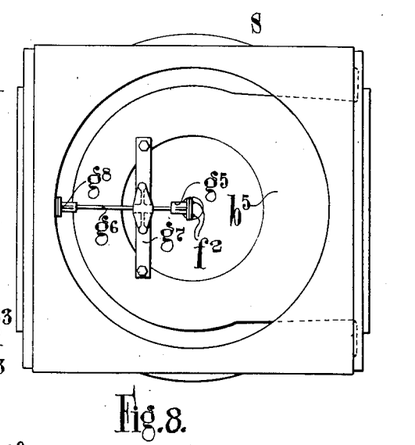
Figure 9:
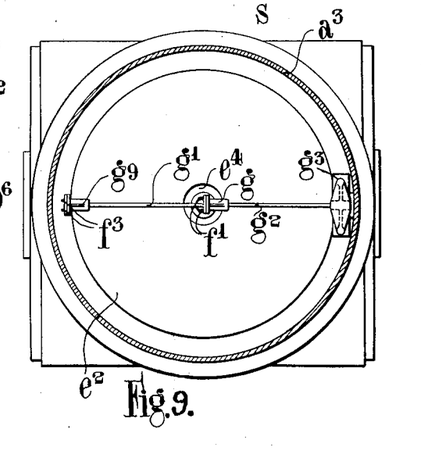

The hereinbefore referred to pressure controlling device or pressure balance which forms the subject matter of a divisional application, Number 334877 is shown in Figs. 7, 8 and 9 in which an upright casing or tower-like structure S formed of lower and upper rectangular members $a$ and $a'$ having cylindrical extensions $a^2$, $a^3$, connected by means of flanges $a^4$ and $a^5$, and the whole surmounted by a cover $a^6$ the casing being provided with two double-beat valve boxes $b$ and $b'$ arranged with the valves $c$ and $c'$ in line vertically one above the other and at some distance apart.

The valve boxes $b$, $b'$ are preferably formed as separate castings inserted through apertures $a^7$, $a^8$ in the sides of the tower, and flanges $b^2$, $b^3$, attached to the boxes by pipe connections $b^4$ and $b^5$, form a fluid-tight joint around the apertures. The two pipe connections $b^4$ and $b^5$ have flanges $b^6$ and $b^7$ upon the outside of the tower to which the pipes supplying the fluids are connected. Upon the opposite side of the tower flanges $a^9$, $a^{10}$ are provided for the pipes conducting the fluids from the apparatus after their pressures have been regulated by means of the double-beat valves, The suitable double-beat valves $c$ and $c'$ preferably open by a downward movement, and in order to reduce the inertia of the moving parts to a minimum the valves are made as light as possible consistent with the necessary rigidity. One or both valves may be constructed as shown in the upper part of the figure of two hollow frusto-conical members $c^2$, $c^3$, supported upon a central tube or column $c^4$ and braced together by a plurality of tension rods or wires $c^5$ evenly distributed around the circumference of the valve just within the seats which are formed on rings $c^6$, $c^7$ of somewhat stouter section adapted to contact with the periphery of the frusto-conical members $c^2$, $c^3$.

Within the cylindrical central portion of the casing or tower between the two valve boxes is a horizontal fluid-tight diaphragm or plate dividing the casing into an upper and a lower compartment each containing a valve. The diaphragm as illustrated forms the top of an ordinary gas bell $d$, the sides of the bell being accommodated in an annular tank $e$ having a rim $e^9$ held between the flanges $a^4$, $a^5$, and containing a suitable liquid sealing medium such as oil.

The bell $d$ may be of the lightest possible construction and the tank $e$ may be provided with supporting members $e'$, $e^2$ adapted to protect the top of the bell should it be subjected to any undue stress. Apertures $e^3$, $e^4$, are provided in these members for allowing access to both sides of the top of the bell. A chamber $e^5$ may also be formed beneath the member $e'$ by means of the bottom $e^6$ and hooded tube $e^7$ into which liquid may flow if the seal is blown by excessive pressure and from which it may drain back into the tank through the ball valve $e^8$.

The apparatus illustrated is arranged to control coal or some other rich gas by means of the lower valve and air by means of the upper one. The gas valve $c$ is therefore of considerably smaller diameter than the air valve $c'$, say in the ratio of about one to three. It is desirable, however, to allow both the valves to have an equal vertical travel for the purpose of maintaining the best balance conditions and under such circumstances the gas valve $c$ is fitted with parabolic or like suitable plugs $c^8$, $c^9$, extending beyond the seatings into the openings and regulating the amount of cross-sectional area of the valve orifice so that a constant proportion between the distance moved and the area of passageway is maintained at all positions of the valve travel.

In the event of low quality or power gas being used the quantities of gas and air in the mixture are substantially equal and both of the double-beat valves $c$ and $c'$ and their boxes $b$ and $b'$ may be of the same diameter.

The lower valve $c$ is directly connected by a flexible tension member or the like $f$ to the center of the under side of the movable diaphragm $d$ and from the center of the upper side of the diaphragm $d$ a double flexible tension member $f'$ is connected to a quadrant $g$ fixed at the center of a horizontal lever $g'$ positioned above the diaphragm $d$ and supported at its end $g^2$ by needle points $g^3$ accommodated in cavities in the fulcrum $g^4$.

The upper valve $c'$ is suspended by means of a double flexible tension member $f^2$ passing over a quadrant $g^5$ fitted upon the end of a horizontal lever $g^6$ positioned above the upper valve box. This lever is pivoted in the manner hereinbefore indicated at one-third of its length from the end from which the valve is suspended and it is supported by a bar $g^7$ attached to the valve box $b'$. From a quadrant $g^8$ upon the opposite end of the lever $g^4$ a flexible tension member $f^3$ is carried downward to a quadrant $g^9$ upon the end of the lever $g'$.

By means of the hereinbefore described system of levers and flexible tension members an upward movement of the diaphragm $d$ results in an upward movement of the lower valve $c$ and a downward movement of the upper valve $c'$. If, therefore, the pressure of the fluid passing into the lower compartment exceeds the pressure of that passing into the upper compartment and the diaphragm moves upward as already indicated the lower double-beat valve will be moved toward its seat and therefore check the flow of fluid through the lower half of the apparatus and thus act to reduce its pressure. At the same time, the upper valve will be lowered, thus increasing the area available for fluid to flow into the upper compartment and tending to increase the pressure therein.

By a suitable arrangement of the weights of the two valves, the diaphragm and the levers and connections, the whole system may be placed in a perfect state of balance, and by reducing the moving weights to the smallest possible amount and eliminating as far as possible the friction attending the movement of the parts, the device may be made to operate with very minute pressure differences say in the neighborhood of one tenth of an inch water gage and to maintain practical uniformity between the pressures of the two fluids issuing from the upper and the lower compartments. By varying the weights on the opposite sides of the balance to a suitable extent, any desired ratio between the pressures of the two fluids may be constantly maintained.

Having now described our invention what we claim as new and desire to secure by Letters Patent is:—

1. In combination in a gas furnace regulating system means for downwardly displacing the products of combustion to automatically maintain a very slight pressure in a furnace a sensitive regulator responsive to minute pressure differences for maintaining constant a practically exact relationship between the pressures of the two elastic fluid constituents of a combustible mixture supplied at low pressure to said furnace and means for mixing said constituents in desired proportions immediately preceding their free inlet to the furnace chamber.

2. In combination in a gas furnace regulating system, means for downwardly displacing the products of combustion from a furnace to automatically maintain a very slight pressure therein depending upon the temperature of the rejected gases, a sensitive regulator responsive to minute pressure differences for maintaining at practically exactly equal low pressures supplies of gas and air thereto and means for mingling said gas and air prior to combustion to effect thorough mixing close to the ignition zone in a single passage opening into the combustion space.

3. In combination in a gas furnace regulating system means for downwardly displacing the products of combustion from a furnace to automatically maintain a very slight pressure therein depending upon the temperature of the rejected waste gases, sensitive regulator means responsive to minute pressure differences for maintaining constant a practically exact relationship between the pressures of two elastic fluid constituents of a combustible mixture supplied at low pressure to said furnace, means for mingling said constituents prior to combustion to effect thorough mixing close to the ignition zone with a low fluid flow resistance and extended passages having narrow slits for distributing the heated elastic fluid medium against the interior surfaces of a heating chamber to maintain uniformity of temperature therein.

4. In combination in a gas furnace regulating system, means for automatically maintaining in a furnace a low back pressure depending upon the temperature of the rejected waste gases, sensitive regulator means responsive to minute pressure differences for maintaining constant a practically exact relationship between the pressures of two elastic fluid constituents of a combustible mixture supplied at low pressure to said furnace, means for mingling said constituents prior to combustion to effect thorough mixing with a low fluid flow resistance, a constricted nozzle the outflow from which provides a combustion region closely following said mixing means and at least one extended slotted conduit or duct for evenly distributing the products of said combustion over the interior surface of a heating chamber to maintain a uniform temperature therein.

5. In combination in a gas furnace regulating system, a furnace outlet flue opening to the atmosphere at a lower level than that at which combustion occurs, a sensitive regulator responsive to minute pressure differences for maintaining constant a practically exact relationship between the pressures of two elastic fluids such as gas and air supplied at low pressure to said furnace, and a vortex mixing device for mingling said fluids prior to combustion closely adjacent to the ignition zone.

6. In combination in a gas furnace regulating system a furnace outlet flue opening to the atmosphere at a lower level than that at which combustion occurs a sensitive regulator responsive to minute differences in low pressure fluids for maintaining constant a practically exact relationship between the pressures of two elastic fluids such as gas and air applied to said furnace, a device for mingling said fluids prior to combustion, an ignition orifice, the outflow from which provides a combustion region closely following said mixing means and at least one extended slotted conduit or duct for evenly distributing the products of said combustion over the interior surface of a heating chamber to maintain a uniform temperature therein.

7. In combination in a gas furnace regulating system, separate supplies of two elastic fluids such as gas and air at low pressures above that of the atmosphere, fluid regulating means responsive to minute pressure differences for maintaining a constant relationship between the pressures of the said fluids, a combustion chamber in which a slight pressure is maintained having at least one constricted nozzle burner for admitting a mixture of said fluids thereto, appliances associated with each of said burner means for mixing said fluids in proportions for a desired chemical combustion reaction with a minimum residue of either constituent, a supply pipe for each fluid for feeding all said appliances and means for regulating at least one supply pipe for compensating for a minor variation in a fluid without altering the adjustments of the mixing appliances.

8. In combination in a gas furnace regulating system, separate supplies of two elastic fluids such as gas and air at low pressures above the atmosphere, a pressure regulating device responsive to minute differences for maintaining a constant relationship between the pressures of said fluids, means for mixing said fluids in proportions for combustion with a minimum residue of either constituent, a heating chamber in which a slight pressure is maintained by a downwardly displaced column of hot gases, an extended combustion chamber fed by a burner, at least one long narrow orifice opening from said combustion chamber to said heating chamber and at least one flue passage jacketing said heating chamber through which the products of combustion are expelled.

9. In combination in a gas furnace regulating system, separate supplies of two elastic fluids such as gas and air at pressures of a few inches of water gage above atmosphere, a pressure regulating device responsive to minute pressure differences for maintaining a constant relationship between the pressures of said fluids, means for mixing said fluids in proportions for combustion with a minimum residue of either constituent, a chamber heated by said combustion, means comprising at least one burner whereby said mixture enters the furnace, a combustion chamber fed by said burner means situated beneath said heating chamber and communicating therewith by at least one narrow slit and at least one flue passage jacketing said heating chamber through which the products of combustion are downwardly expelled so as to maintain a slight pressure in said system.

10. In combination in a gaseous fuel furnace system, separate supplies of two elastic fluids such as gas and air at controlled pressures above atmosphere, means for mixing said fluids in proportions for combustion with a minimum residue of either constituent, a chamber heated by said combustion, means comprising at least one burner whereby said mixture enters the furnace, a combustion chamber fed by said burner means communicating with said heating chamber by at least one long narrow orifice and at least one flue passage jacketing said heating chamber through which the products of combustion are downwardly expelled so as to maintain a plenum in said system.

11. In combination in a gaseous fuel furnace system, separate supplies of two elastic fluids such as gas and air at controlled pressures above atmosphere, means for mixing said fluids in proportions for combustion with a minimum residue of either constituent, a chamber heated by said combustion, means comprising at least one burner whereby said mixture enters the furnace, a combustion chamber fed by said burner means situated beneath said heating chamber and communicating therewith by at least one narrow slit around the perimeter thereof and at least one flue passage jacketing said heating chamber through which the products of combustion are downwardly expelled so as to maintain a plenum in said system.

In testimony whereof we have signed our names to this specification.

ALEXANDER CONSTANTINE IONIDES, Jr.
SIDNEY VICTOR COOKE.